US012621540B2

(12) United States Patent
Rakshit et al.

(10) Patent No.: US 12,621,540 B2
(45) Date of Patent: May 5, 2026

(54) PERSONALIZED REAL-TIME ADVERTISEMENT CONTENT GENERATION

(71) Applicant: International Business Machines Corporation, Armonk, NY (US)

(72) Inventors: Sarbajit K. Rakshit, Kolkata (IN); Sathya Santhar, Chennai (IN); Sridevi Kannan, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/430,847

(22) Filed: Feb. 2, 2024

(65) Prior Publication Data

US 2025/0254401 A1 Aug. 7, 2025

(51) Int. Cl.
*H04N 21/81* (2011.01)
*G06F 40/40* (2020.01)

(52) U.S. Cl.
CPC ........... *H04N 21/812* (2013.01); *G06F 40/40* (2020.01)

(58) Field of Classification Search
CPC .............................. H04N 21/821; G06F 40/40
See application file for complete search history.

(56) References Cited

U.S. PATENT DOCUMENTS

| | | | |
|---|---|---|---|
| 2002/0091568 A1 | 7/2002 | Kraft et al. | |
| 2013/0013448 A1* | 1/2013 | Bradley ................. | G06Q 30/02 705/26.7 |

| | | | |
|---|---|---|---|
| 2015/0025967 A1* | 1/2015 | Ellison ............... | G06Q 30/0261 705/14.58 |
| 2017/0238067 A1 | 8/2017 | Sharma et al. | |
| 2019/0251612 A1* | 8/2019 | Fang .................. | G06Q 30/0643 |
| 2020/0134089 A1 | 4/2020 | Sankaran et al. | |
| 2020/0228880 A1 | 7/2020 | Iyer et al. | |
| 2023/0139513 A1* | 5/2023 | Verma ............... | G06Q 30/0269 705/14.54 |

(Continued)

FOREIGN PATENT DOCUMENTS

KR 20230123559 A 8/2023

OTHER PUBLICATIONS

Valcourt, Using Dynamic Creative Optimization to Customize Your Ad Creatives, Mar. 8, 2023, https://grapeseedmedia.com/blog/using-dynamic-creative-optimization-to-customize-your-ad-creatives/.

(Continued)

*Primary Examiner* — Chenea Davis
(74) *Attorney, Agent, or Firm* — Garg Law Firm, PLLC; Rakesh Garg; Maeve Carpenter

(57) ABSTRACT

An embodiment predicts a most preferred product in a plurality of products, the predicting using a trained neural network, data of a user, and real-time availability data of the plurality of products, wherein the most preferred product is specific to the user. An embodiment generates, in real time, using a large language model, a script, the script comprising natural language text comprising a customized offer of the most preferred product to the user An embodiment generates, in real time, using the script and a generative adversarial network (GAN), a content customized to the most preferred product and the user, wherein the content comprises at least one of an audio portion and a video portion. An embodiment presents, on a device corresponding to the user, the content.

20 Claims, 6 Drawing Sheets

(56)                     References Cited

U.S. PATENT DOCUMENTS

| | | | | |
|---|---|---|---|---|
| 2023/0291710 A1* | 9/2023 | Shafer | ................... | H04L 63/102 |
| 2024/0292070 A1* | 8/2024 | Li | ........................ | H04N 21/816 |
| 2024/0346547 A1* | 10/2024 | Myers | ................ | G06Q 30/0244 |

OTHER PUBLICATIONS

Tech Hazel, Revolutionizing Google Ads with AI-generated Content, Jan. 17, 2023, https://www.linkedin.com/pulse/revolutionizing-google-ads-ai-generated-content-tech-hazel.

Amazon Ads, Dynamic creative optimization (DCO): Definition, examples, tips, 2023, https://advertising.amazon.com/library/guides/dco-dynamic-creative-optimization.

IBM Watson Advertising, What is Dynamic Creative Optimization (DCO)? Benefits & Examples, Aug. 15, 2022, https://www.ibm.com/watson-advertising/thought-leadership/what-is-dynamic-creative-optimization.

Oberthaler, What is dynamic creative optimization (DCO) & why it is so powerful for creative teams, Mar. 27, 2023, https://www.ziflow.com/blog/dynamic-creative-optimization.

* cited by examiner

*Fig. 3*

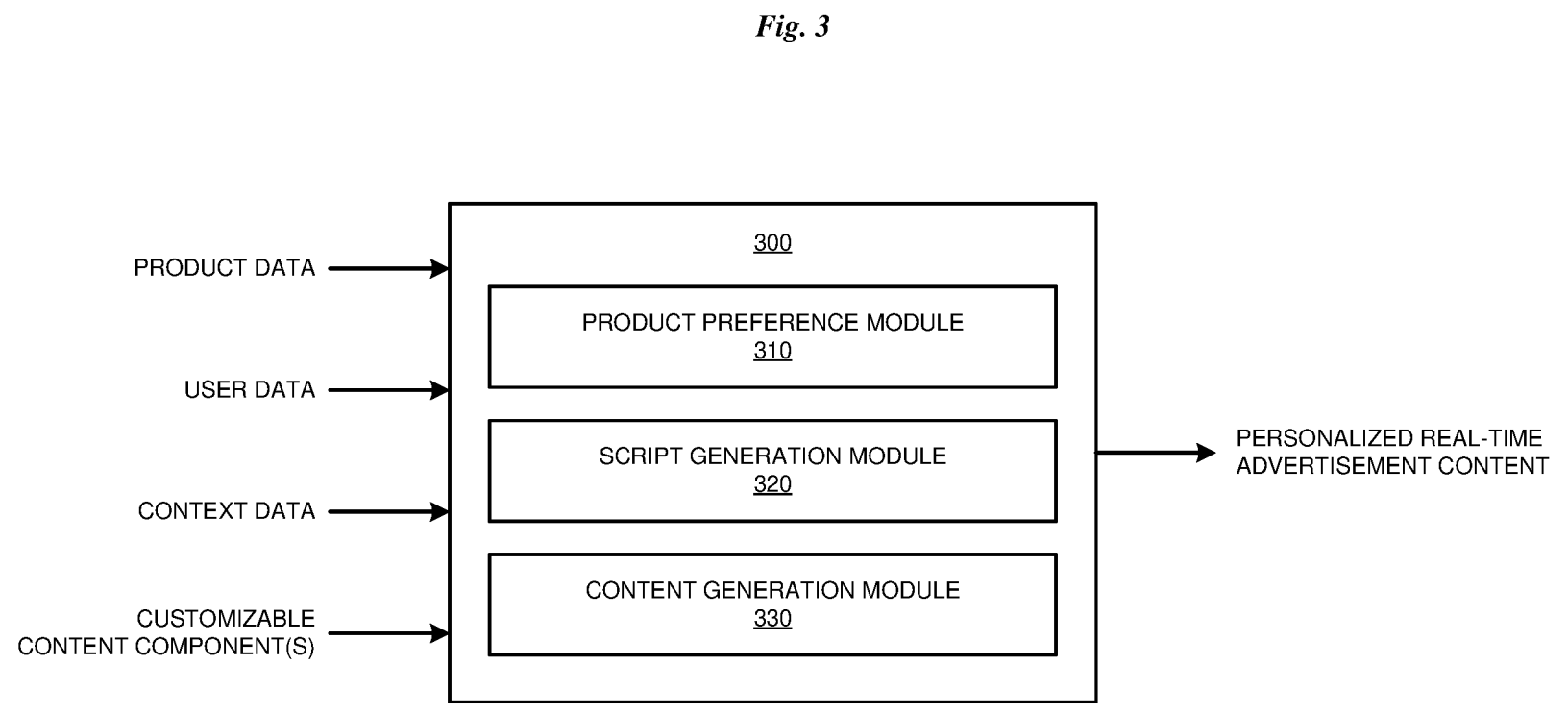

PRODUCT DATA

USER DATA

CONTEXT DATA

CUSTOMIZABLE CONTENT COMPONENT(S)

300

PRODUCT PREFERENCE MODULE 310

SCRIPT GENERATION MODULE 320

CONTENT GENERATION MODULE 330

PERSONALIZED REAL-TIME ADVERTISEMENT CONTENT

PERSONALIZED REAL-TIME ADVERTISEMENT CONTENT GENERATION

BACKGROUND

The present invention relates generally to advertisement content generation. More particularly, the present invention relates to a method, system, and computer program for personalized real-time advertisement content generation.

As used herein, real-time content generation, or content generation performed in real-time, refers to content generation that is performed within a specified time period of an event triggering the content generation. The specified time period is generally on the order of one second or less. Thus, real-time content generation is unlike content that is generated and stored for later playback.

As used herein, personalized content generation refers to generating content that is generated according to the inferred needs or desires of a particular user.

Dynamic advertisements, or ads, unlike traditional static ads, are adjustable in content and presentation based on real-time data, contextual factors, and individual user attributes. By harnessing the power of advanced technology, dynamic ads provide a highly personalized and engaging experience to consumers, maximizing relevance and thus sales of a product being advertised. Unlike traditional static ads that display the same content to all viewers, dynamic ads are adaptable, using data points such as user behavior, location, browsing history, demographics, and environmental conditions to customize the ad content, so that an individual ad viewer sees an ad that resonates with the viewer's specific interests and needs.

Dynamic ads are presented in various forms, ranging from simple text and still images to more complex multimedia presentations including video and interactive elements. A dynamic ad presentation system typically makes real-time decisions about which content to display, tailoring displayed content to an individual user. One of the key strengths of dynamic ads lies in their ability to maximize relevancy while minimizing ad fatigue. Instead of bombarding users with repetitive content, dynamic ads provide fresh and engaging experiences, enhancing user engagement and mitigating the risk of ad blindness. As a result, businesses use dynamic ads to achieve a multitude of objectives, such as retargeting, product recommendations, location-based promotions, and time-sensitive offers.

Dynamic Creative Optimization (DCO) is an approach to advertising that tailors ad content in real-time to individual users, contexts, and preferences. By leveraging data-driven insights and advanced algorithms, DCO transforms static ad campaigns into dynamic and personalized experiences. DCO allows advertisers to dynamically adjust various ad elements, such as images, text, offers, and calls-to-action, to align with each viewer's unique characteristics.

SUMMARY

The illustrative embodiments provide for personalized real-time advertisement content generation. An embodiment includes predicting a most preferred product in a plurality of products, the predicting using a trained neural network, data of a user, and real-time availability data of the plurality of products, wherein the most preferred product is specific to the user. An embodiment includes generating, in real time, using a large language model, a script, the script comprising natural language text comprising a customized offer of the most preferred product to the user. An embodiment includes generating, in real time, using the script and a generative adversarial network (GAN), a content customized to the most preferred product and the user, wherein the content comprises at least one of an audio portion and a video portion. An embodiment includes presenting, on a device corresponding to the user, the content. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a block diagram of an example configuration for personalized real-time advertisement content generation in accordance with an illustrative embodiment;

DETAILED DESCRIPTION

Figure 1:
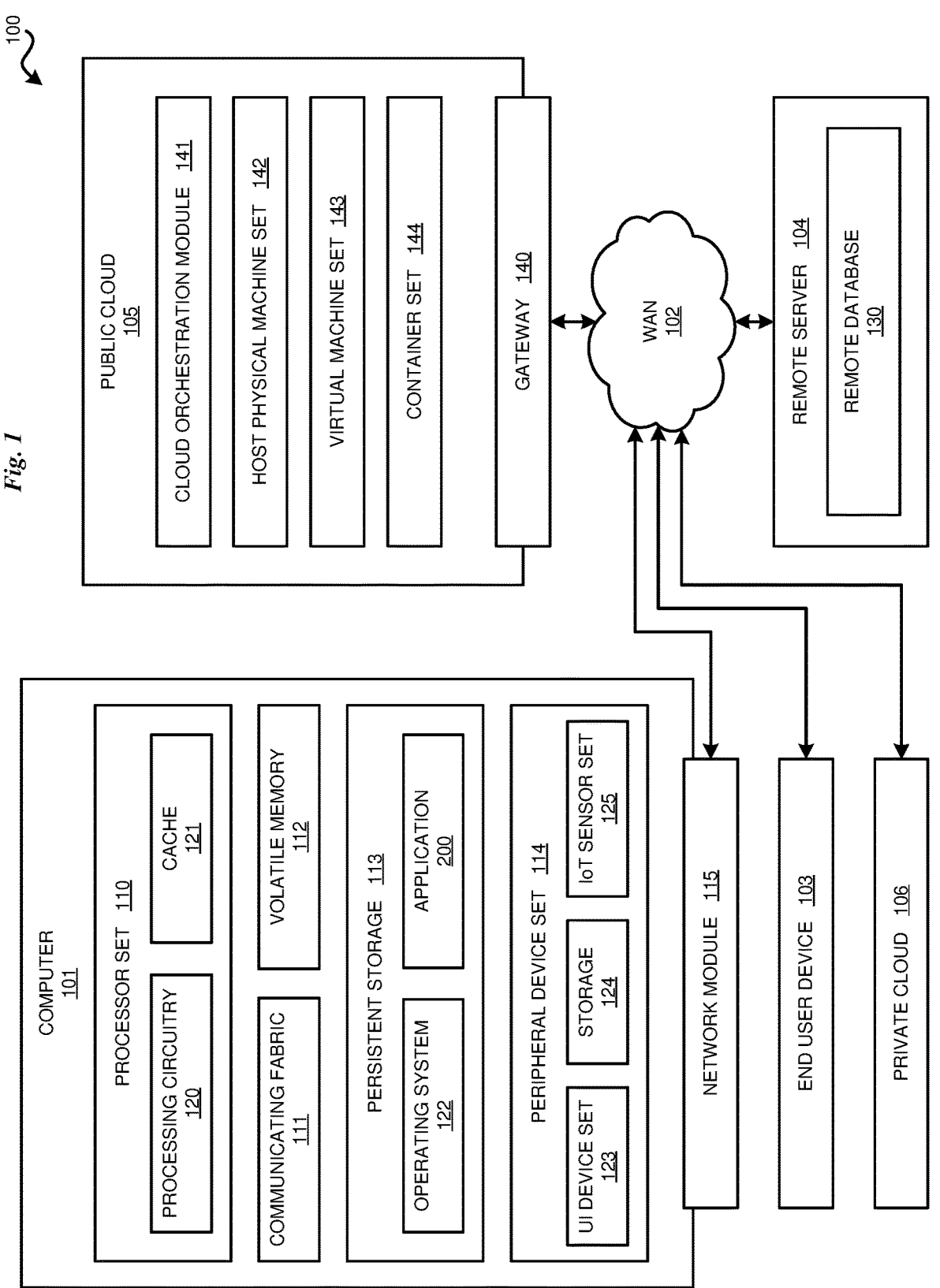
FIG. 1 depicts a block diagram of a computing environment in accordance with an illustrative embodiment.

The illustrative embodiments recognize that existing DCO systems focus on basic personalization, such as filling in a user's name in a static ad text or image, and often use only a few data points per user. Thus, existing solutions lack the ability to create more intricate and engaging narratives that can adapt to multiple user parameters. As well, existing DCO systems that do utilize dynamic content adhere to predefined storylines, and thus do not fully leverage real-time data to adapt the narrative, or script, of the ad to changing conditions. Existing DCO systems also do not integrate data sources such as real-time product inventory, real-time user location, user history, and temporal context. Thus, the illustrative embodiments recognize that there is an unmet need to improve real-time ad content generation by using data sources such as real-time product inventory, real-time user location, user history, and temporal context, to generate user-specific narratives and content.

The present disclosure addresses the deficiencies described above by providing a process (as well as a system, method, machine-readable medium, etc.) that predicts, using data of a user and real-time availability data of a plurality of products, a user-specific most preferred product in the plurality of products; generates a script comprising natural language text comprising a customized offer of the most preferred product to the user; generates, using the script, a content customized to the most preferred product and the user; and presents, on a device corresponding to the user, the content. Thus, the illustrative embodiments provide for personalized real-time advertisement content generation.

An illustrative embodiment receives product data of products for which an advertisement could be generated. Some non-limiting examples of product data are product specifications, product purchase data, data correlating product interest and purchase with purchaser characteristics, and product location, discount and other offers, and availability data, sourced from application programming interfaces (APIs), data feeds, integration with a third-party data service, and the like. Some product data (e.g., product specifications) changes infrequently, and some product data (e.g., product location and availability data) changes more frequently or in real-time as products are shipped to a retail location or warehouse, or sold.

An illustrative embodiment receives user data of one or more users to whom a personalized advertisement could be presented. The user data is provided on an opt-in basis. Some non-limiting examples of user data are a user's current location and location history, a user's online behavior (a user's interactions with a product, website, or a category of product or website), interactions (a user's previous purchases and social media activity or other engagement with a product), user demographic data, and stated or inferred product preferences. Some user data (e.g., a user's current location) is real-time data. One embodiment maintains user data for an individual user in a user profile.

An illustrative embodiment receives user context data for use in generating a personalized ad. Some non-limiting examples of user context data are the time of day and day of the week, local weather conditions and forecasts, local traffic conditions and forecasts, and local events. Context data helps further personalize an ad. For example, if it is cold outside, a user might be interested in an ad for hot soup, while if it is very hot outside, the user might be interested in an ad for an iced drink.

An embodiment uses a trained neural network to predict, from a plurality of products, a user's most preferred product. One embodiment uses real-time data, or a combination of real-time and historical data, to predict a user's most preferred product in real-time. In one embodiment, the trained neural network is a deep neural network (DNN), an artificial neural network with multiple layers between input and output layers of the network. In particular, inputs to the DNN, including one or more of a user's online behavior, interactions, user demographic data, and product availability and offer data, are processed by an embedding layer. The embedding layer represents portions of data as embeddings, or multidimensional numbers, in a space in which proximity between embeddings denotes a semantic relationship between the embeddings. Following the embedding layer, embeddings representing a user's online behavior and interactions are fed through a sequential layer, implemented as a recurrent neural network (RNN), to capture temporal patterns and sequence dependencies, for example patterns like browsing sequences leading to purchases. An RNN is a bi-directional artificial neural network, meaning that the network allows the output from some nodes to affect subsequent input to the same nodes. Following the sequential layer, the DNN includes one or more dense, or fully connected, neural network layers, followed by a product availability/offer layer integrating embeddings representing product data with user data, and including a softmax activation function to ensure that outputs of the layer sum up to one. Thus, the output from the DNN is a probability distribution over available products, indicating the likelihood of user preference for each product. An embodiment constructs a ranked list of products, ranked according to likelihood of user preference for each product, from most likely to least. The product with the highest predicted probability is the user's most preferred product based on the products that are available. Other presently available neural network implementations used to determine the user's most preferred product are also possible and contemplated within the scope of the illustrative embodiments.

An embodiment identifies product, user, and context data that are sufficiently relevant to the user's most preferred product and the current context, including data such as product availability and location, the user's location, an activity the user is currently performing, a user's most often used or purchased product, mode of travel, and the current weather and time. An embodiment uses a large language model to generate a script in real time. The script is natural language text comprising a customized offer of the most preferred product to the user. A large language model, a presently available technique, is an artificial neural network that has learned statistical relationships from text documents during training and, once trained, is capable of general-purpose language generation. In particular, an embodiment constructs a prompt including the user's most preferred product, as a keyword, along with other relevant data, and inputs the prompt to the large language model. The large language model responds to the prompt by producing text of a script. For example, if the user's most preferred product is soup, one prompt might be, "write an ad incorporating the following: the user's most preferred product is soup, the user is one block from Restaurant A which has added soup to a product availability database, it is noon, and the outside temperature is 0° C.", and one corresponding output script might be, "It's cold out! Warm up with soup for lunch, just one block away at Restaurant A." Using real-time data from product inventory and user preferences to generate a script in real-time ensures that product availability and offers are up to date.

An embodiment uses the script to generate, in real time, a content customized to the most preferred product and the user. In particular, an embodiment uses a presently available text to speech conversion technique to convert the script into a corresponding audio portion of content.

An embodiment uses a generative adversarial network (GAN) to generate still images or video described in the script. A GAN is a presently available technique that includes two artificial neural networks, a generative network and a discriminative network. The generative network generates candidates (here, images) while the discriminative network evaluates sample data as being real or generated by the generative network. Thus, during training the generative network learns to fool the discriminator network by producing novel candidates that the discriminator thinks are actually real. In particular, an embodiment extracts relevant words from the script, and uses the extracted words as input to a GAN. Random noise is also input to the GAN, along with conditioning input such as customizable content components, a dataset of images and scenes that are sufficiently similar to the script's context. Conditioning input is additional data (such as class labels or data) input to a GAN to constrain the GAN's output-here, to produce output that looks similar to the customizable content components, but using the script. The dataset is annotated with labels that correspond to different user contexts, product availability scenarios, and locations. During training, the GAN learns to generate images that correspond to the script. For example, if the script highlights a user easily accessing a product nearby, the GAN-generated images depict this scenario.

An embodiment presents generated content on a device corresponding to the user. Thus, the generated content incorporates real-time product and user data into advertisement content that is personalized and generated in real-time.

An embodiment performs real-time analytics on generated content, including a user's response to the generated content, and uses results of the analytics to improve content server load and response times, as well as content quality and user relevance.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as module 200 implementing personalized real-time advertisement content generation. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
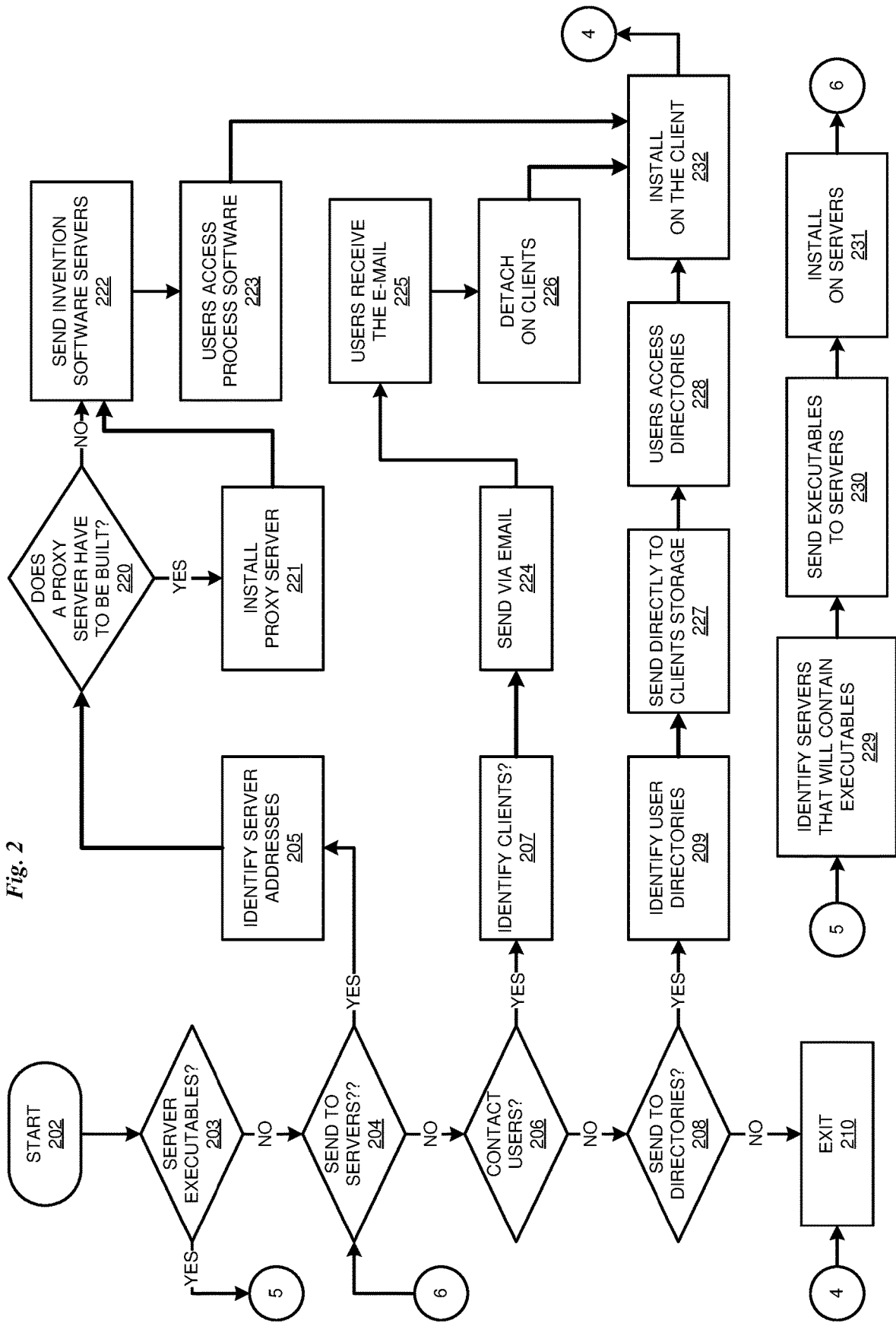
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing personalized real-time advertisement content generation may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

With reference to FIG. 3, this figure depicts a block diagram of an example configuration for personalized real-time advertisement content generation in accordance with an illustrative embodiment. Application 300 is the same as application 200 in FIG. 1.

In the illustrated embodiment, application 300 receives product data of products for which an advertisement could be generated. Some non-limiting examples of product data are product specifications, product purchase data, data correlating product interest and purchase with purchaser characteristics, and product location, discount and other offers, and availability data, sourced from APIs, data feeds, integration with a third-party data service, and the like. Some product data (e.g., product specifications) changes infrequently, and some product data (e.g., product location and availability data) changes more frequently or in real-time as products are shipped to a retail location or warehouse, or sold.

Application 300 receives user data of one or more users to whom a personalized advertisement could be presented. The user data is provided on an opt-in basis. Some non-limiting examples of user data are a user's current location and location history, a user's online behavior (a user's interactions with a product, website, or a category of product or website), interactions (a user's previous purchases and social media activity or other engagement with a product), user demographic data, and stated or inferred product preferences. Some user data (e.g., a user's current location) is real-time data. One implementation of application 300 maintains user data for an individual user in a user profile.

Application 300 receives user context data for use in generating a personalized ad. Some non-limiting examples of user context data are the time of day and day of the week, local weather conditions and forecasts, local traffic conditions and forecasts, and local events. Context data helps further personalize an ad. For example, if it is cold outside, a user might be interested in an ad for hot soup, while if it is very hot outside, the user might be interested in an ad for an iced drink.

Product preference module 310 uses a trained neural network to predict, from a plurality of products, a user's most preferred product. One implementation of module 310 uses real-time data, or a combination of real-time and historical data, to predict a user's most preferred product in real-time. In one implementation of module 310, the trained neural network is a DNN, an artificial neural network with multiple layers between input and output layers of the network. In particular, inputs to the DNN, including one or more of a user's online behavior, interactions, user demographic data, and product availability and offer data, are processed by an embedding layer. The embedding layer represents portions of data as embeddings, or multidimensional numbers, in a space in which proximity between embeddings denotes a semantic relationship between the embeddings. Following the embedding layer, embeddings representing a user's online behavior and interactions are fed through a sequential layer, implemented as an RNN, to capture temporal patterns and sequence dependencies, for example patterns like browsing sequences leading to purchases. An RNN is a bi-directional artificial neural network, meaning that the network allows the output from some nodes to affect subsequent input to the same nodes. Following the sequential layer, the DNN includes one or more dense, or fully connected, neural network layers, followed by a product availability/offer layer integrating embeddings representing product data with user data, and including a softmax activation function to ensure that outputs of the layer sum up to one. Thus, the output from the DNN is a probability distribution over available products, indicating the likelihood of user preference for each product. Module 310 constructs a ranked list of products, ranked according to likelihood of user preference for each product, from most likely to least. The product with the highest predicted probability is the user's most preferred product based on the products that are available. Other presently available neural network implementations used to determine the user's most preferred product are also possible.

Script generation module 320 identifies product, user, and context data that are sufficiently relevant to the user's most preferred product and the current context, including data such as product availability and location, the user's location, an activity the user is currently performing, a user's most often used or purchased product, mode of travel, and the current weather and time. One implementation of module 320 uses a large language model to generate a script in real time. The script is natural language text comprising a customized offer of the most preferred product to the user. A large language model, a presently available technique, is an artificial neural network that has learned statistical relationships from text documents during training and, once trained, is capable of general-purpose language generation. In particular, module 320 constructs a prompt including the user's most preferred product, as a keyword, along with other relevant data, and inputs the prompt to the large language model. The large language model responds to the prompt by producing text of a script. For example, if the user's most preferred product is soup, one prompt might be, "write an ad incorporating the following: the user's most preferred product is soup, the user is one block from Restaurant A which has added soup to a product availability database, it is noon, and the outside temperature is 0° C.", and one corresponding output script might be, "It's cold out! Warm up with soup for lunch, just one block away at Restaurant A." Using real-time data from product inventory and user preferences to generate a script in real-time ensures that product availability and offers are up to date.

Content generation module 330 uses the script to generate, in real time, a content customized to the most preferred product and the user. In particular, module 330 uses a presently available text to speech conversion technique to convert the script into a corresponding audio portion of content.

Module 330 uses a GAN to generate still images or video described in the script. A GAN is a presently available technique that includes two artificial neural networks, a generative network and a discriminative network. The generative network generates candidates (here, images) while the discriminative network evaluates sample data as being real or generated by the generative network. Thus, during training the generative network learns to fool the discriminator network by producing novel candidates that the discriminator thinks are actually real. In particular, module 330 extracts relevant words from the script, and uses the extracted words as input to a GAN. Random noise is also input to the GAN, along with conditioning input such as customizable content components, a dataset of images and scenes that are sufficiently similar to the script's context. Conditioning input is additional data (such as class labels or data) input to a GAN to constrain the GAN's output-here, to produce output that looks similar to the customizable content components, but using the script. The dataset is annotated with labels that correspond to different user contexts, product availability scenarios, and locations. During training, the GAN learns to generate images that correspond to the script. For example, if the script highlights a user easily accessing a product nearby, the GAN-generated images depict this scenario.

Application 300 presents generated content on a device corresponding to the user. Thus, the generated content incorporates real-time product and user data into advertisement content that is personalized and generated in real-time.

Application 300 performs real-time analytics on generated content, including a user's response to the generated content, and uses results of the analytics to improve content server load and response times, as well as content quality and user relevance.

Figure 4:
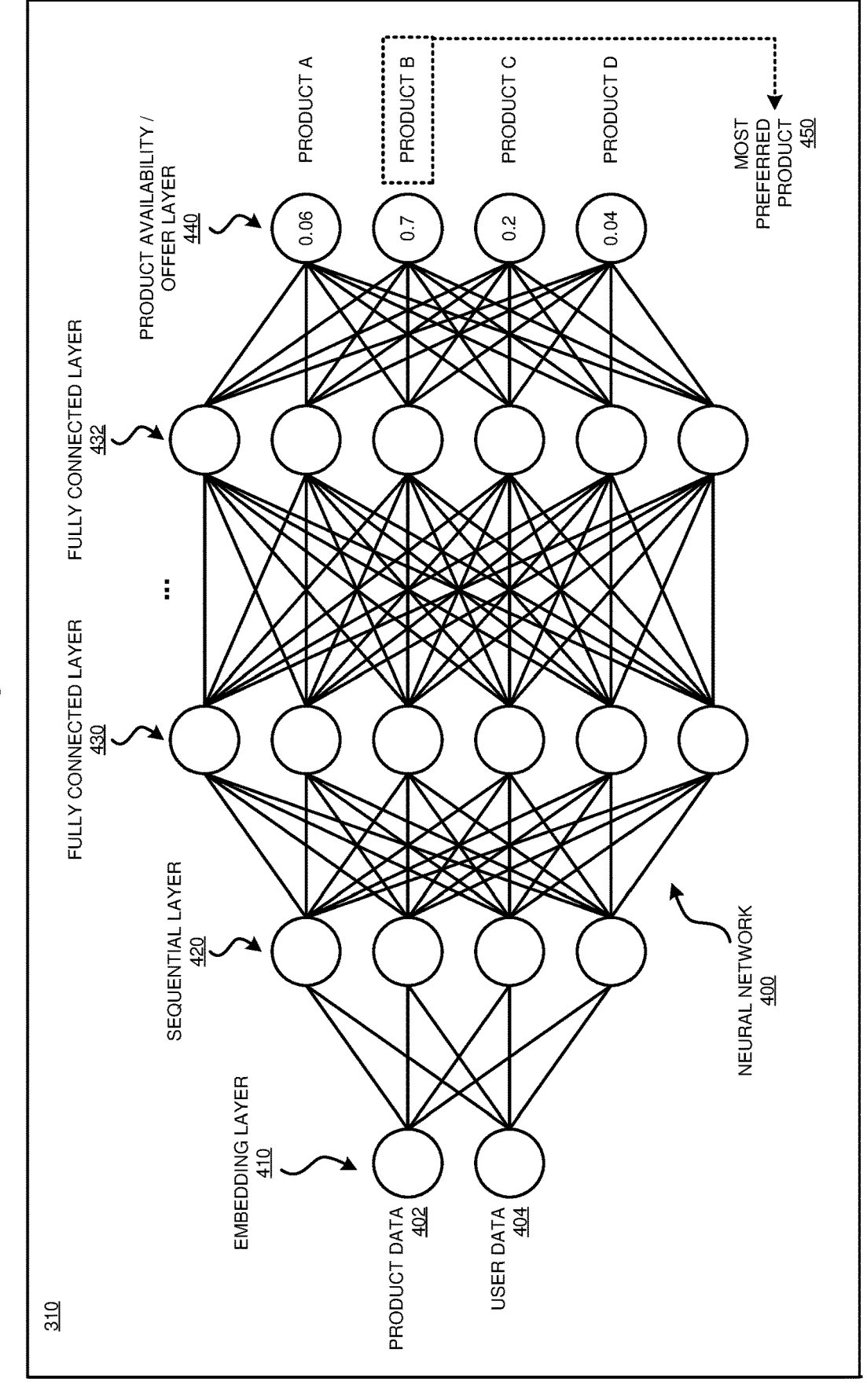
FIG. 4 depicts an example of personalized real-time advertisement content generation in accordance with an illustrative embodiment.

With reference to FIG. 4, this figure depicts an example of personalized real-time advertisement content generation in accordance with an illustrative embodiment. The example can be executed using application 300 in FIG. 3. Product preference module 310 is the same as product preference module 310 in FIG. 3.

As depicted, product data 402 and user data 404 are input to embedding layer 410 of neural network 400. Note that neural network 400 is depicted schematically, only as an example, and that not every connection between nodes of neural network 400 is depicted. Embedding layer 410 represents portions of data as embeddings, or multidimensional numbers, in a space in which proximity between embeddings denotes a semantic relationship between the embeddings. Following embedding layer 410, a user's online behavior and interactions are fed through sequential layer 420, implemented as an RNN, to capture temporal patterns and sequence dependencies, for example patterns like browsing sequences leading to purchases. Following sequential layer 420, neural network 400 includes fully connected layers 430 and 432 (depicted only as examples; more or fewer fully connected layers are also possible), followed by product availability/offer layer 440 integrating product data 402 with user data 404, and including a softmax activation function to ensure that outputs of layer 440 sum up to one. Thus, the output from neural network 400 is a probability distribution over available products, indicating the likelihood of user preference for each product (indicated by numbers depicted in nodes of layer 440). Product B is the product with the highest predicted probability, and thus is designated as most preferred product 450 based on the products that are available.

Figure 5:
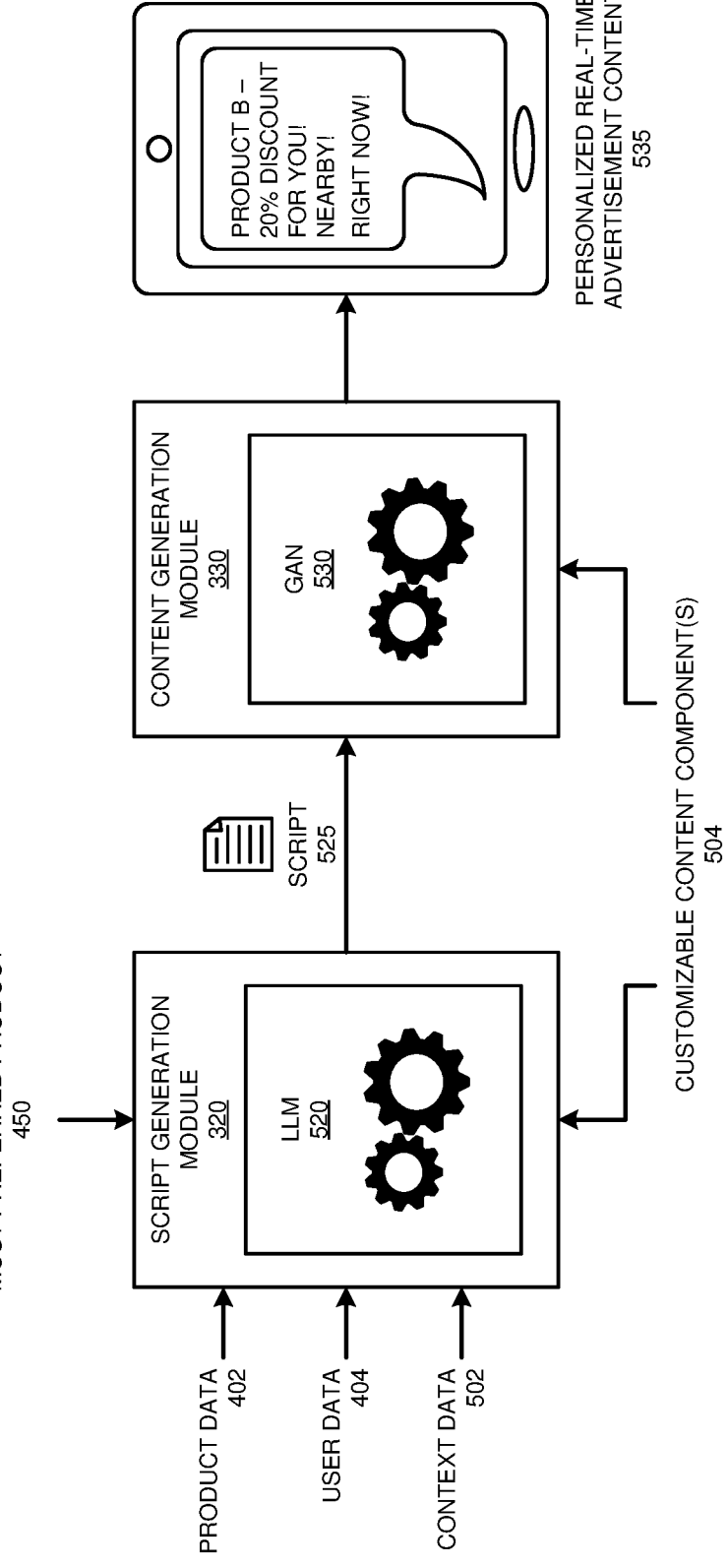
FIG. 5 depicts a continued example of personalized real-time advertisement content generation in accordance with an illustrative embodiment.

With reference to FIG. 5, this figure depicts a continued example of personalized real-time advertisement content generation in accordance with an illustrative embodiment. Script generation module 320 and content generation module 330 are the same as script generation module 320 and content generation module 330 in FIG. 3. Product data 402, user data 404, and most preferred product 450 are the same as product data 402, user data 404, and most preferred product 450 in FIG. 4.

Script generation module 320 identifies data within product data 402, user data 404, and context data 502 that are sufficiently relevant to most preferred product 450 and the current context, including data such as product availability and location, the user's location, and the temperature and time of day. Module 320 uses LLM 520 to generate script 525 in real time. Script 525 is natural language text comprising a customized offer of most preferred product 450 to a user.

Content generation module 330 uses script 525 to generate, in real time, personalized real-time advertisement content 535, customized to the most preferred product and the user. In particular, module 330 uses a presently available text to speech conversion technique to convert script 525 into a corresponding audio portion of content 535. Module 330 uses GAN 530 and customizable content components 504 to generate still images or video described in script 525, thus generating a video portion of content 535. Application 300 presents content 535 on a device corresponding to the user.

Figure 6:
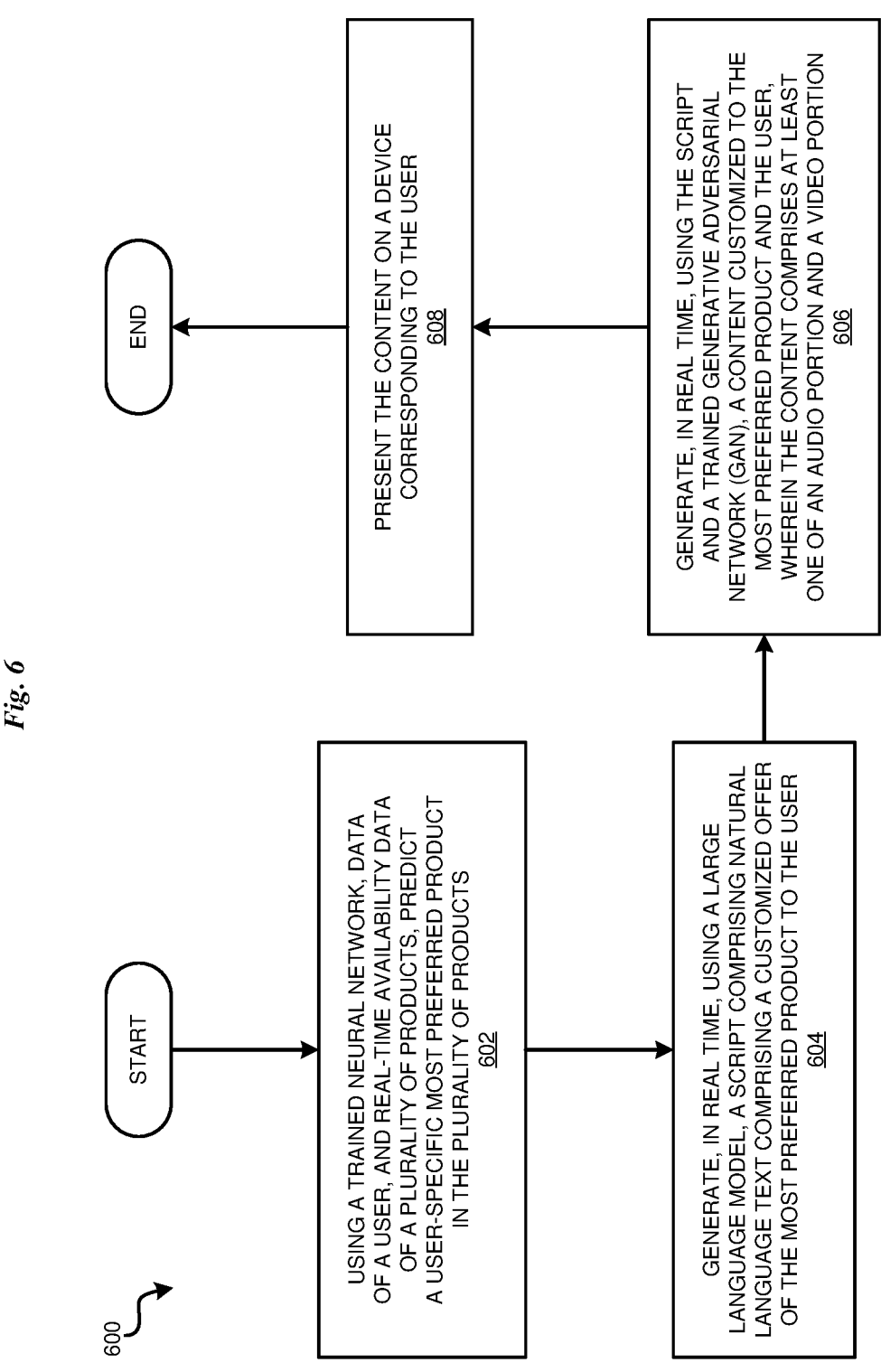
FIG. 6 depicts a flowchart of an example process for personalized real-time advertisement content generation in accordance with an illustrative embodiment.

With reference to FIG. 6, this figure depicts a flowchart of an example process for personalized real-time advertisement content generation in accordance with an illustrative embodiment. Process 600 can be implemented in application 200 in FIG. 3.

In the illustrated embodiment, at block 602, the process, using a trained neural network, data of a user, and real-time availability data of a plurality of products, predicts a user-specific most preferred product in the plurality of products. At block 604, the process generates, in real time, using a large language model, a script comprising natural language text comprising a customized offer of the most preferred product to the user. At block 606, the process generates, in real time, using the script and a trained generative adversarial network (GAN), a content customized to the most preferred product and the user, wherein the content comprises at least one of an audio portion and a video portion. At block 608, the process presents the content on a device corresponding to the user.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

predicting a most preferred product in a plurality of products, the predicting using a trained neural network, data of a user, and real-time availability data of the plurality of products, wherein the most preferred product is specific to the user, and wherein the data of the user comprises an activity being performed by the user at a time of the predicting, and the user's mode of travel;

generating, in real time, using a large language model, a script, the script comprising natural language text comprising a customized offer of the most preferred product to the user;

generating, in real time, using the script and a generative adversarial network (GAN), a content customized to the most preferred product and the user, wherein the content comprises at least one of an audio portion and a video portion; and presenting, on a device corresponding to the user, the content.

2. The computer-implemented method of claim 1, further comprising:

predicting, using context data corresponding to the user, the most preferred product.

3. The computer-implemented method of claim 1, wherein an input to the GAN comprises scene data, wherein the scene data describes a scene that has a degree of similarity with a context of the script, and wherein predicting the most preferred product in the plurality of products comprises:

computing, using the trained neural network, a probability distribution corresponding to the plurality of products, wherein the most preferred product is the highest probability product in the probability distribution.

4. The computer-implemented method of claim 1, wherein generating the script comprises:

constructing a prompt to the large language model, the prompt comprising the most preferred product; and causing, using the prompt, the large language model to generate the script.

5. The computer-implemented method of claim 1, wherein the audio portion of the content comprises text of the script converted into audio form.

6. The computer-implemented method of claim 1, wherein the video portion of the content comprises video generated by the GAN.

7. A computer program product comprising one or more computer readable storage media, and program instructions collectively stored on the one or more computer readable storage media, the program instructions executable by a processor to cause the processor to perform operations comprising:

predicting a most preferred product in a plurality of products, the predicting using a trained neural network, data of a user, and real-time availability data of the plurality of products, wherein the most preferred product is specific to the user, and wherein the data of the user comprises an activity being performed by the user at a time of the predicting, and the user's mode of travel;

generating, in real time, using a large language model, a script, the script comprising natural language text comprising a customized offer of the most preferred product to the user;

generating, in real time, using the script and a generative adversarial network (GAN), a content customized to the most preferred product and the user, wherein the content comprises at least one of an audio portion and a video portion; and presenting, on a device corresponding to the user, the content.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, further comprising:

predicting, using context data corresponding to the user, the most preferred product.

11. The computer program product of claim 7, wherein an input to the GAN comprises scene data, wherein the scene data describes a scene that has a degree of similarity with a context of the script, and wherein predicting the most preferred product in the plurality of products comprises:

computing, using the trained neural network, a probability distribution corresponding to the plurality of products, wherein the most preferred product is the highest probability product in the probability distribution.

12. The computer program product of claim 7, wherein generating the script comprises:

constructing a prompt to the large language model, the prompt comprising the most preferred product; and causing, using the prompt, the large language model to generate the script.

13. The computer program product of claim 7, wherein the audio portion of the content comprises text of the script converted into audio form.

14. The computer program product of claim 7, wherein the video portion of the content comprises video generated by the GAN.

15. A computer system comprising a processor and one or more computer readable storage media, and program instructions collectively stored on the one or more computer readable storage media, the program instructions executable by the processor to cause the processor to perform operations comprising:

predicting a most preferred product in a plurality of products, the predicting using a trained neural network, data of a user, and real-time availability data of the plurality of products, wherein the most preferred product is specific to the user, and wherein the data of the user comprises an activity being performed by the user at a time of the predicting, and the user's mode of travel;

generating, in real time, using a large language model, a script, the script comprising natural language text comprising a customized offer of the most preferred product to the user;

generating, in real time, using the script and a generative adversarial network (GAN), a content customized to the most preferred product and the user, wherein the content comprises at least one of an audio portion and a video portion; and presenting, on a device corresponding to the user, the content.

16. The computer system of claim 15, further comprising:
    predicting, using context data corresponding to the user, the most preferred product.

17. The computer system of claim 15, wherein an input to the GAN comprises scene data, wherein the scene data describes a scene that has a degree of similarity with a context of the script, and wherein predicting the most preferred product in the plurality of products comprises:
    computing, using the trained neural network, a probability distribution corresponding to the plurality of products, wherein the most preferred product is the highest probability product in the probability distribution.

18. The computer system of claim 15, wherein generating the script comprises:
    constructing a prompt to the large language model, the prompt comprising the most preferred product; and
    causing, using the prompt, the large language model to generate the script.

19. The computer system of claim 15, wherein the audio portion of the content comprises text of the script converted into audio form.

20. The computer system of claim 15, wherein the video portion of the content comprises video generated by the GAN.

\* \* \* \* \*